(12) United States Patent
Saito et al.

(10) Patent No.: US 11,359,718 B2
(45) Date of Patent: Jun. 14, 2022

(54) SHIFT CONTROL DEVICE FOR AUTOMATIC TRANSMISSION

(71) Applicant: Mazda Motor Corporation, Hiroshima (JP)

(72) Inventors: Tadashi Saito, Hiroshima (JP); Tomohiro Kubo, Hiroshima (JP); Hiroki Hanae, Hiroshima (JP); Yasunari Nakayama, Kure (JP)

(73) Assignee: Mazda Motor Corporation, Hiroshima (JP)

( * ) Notice: Subject to any disclaimer, the term of this patent is extended or adjusted under 35 U.S.C. 154(b) by 275 days.

(21) Appl. No.: 16/754,876

(22) PCT Filed: Oct. 5, 2018

(86) PCT No.: PCT/JP2018/037363
§ 371 (c)(1),
(2) Date: Apr. 9, 2020

(87) PCT Pub. No.: WO2019/078037
PCT Pub. Date: Apr. 25, 2019

(65) Prior Publication Data
US 2020/0309260 A1    Oct. 1, 2020

(30) Foreign Application Priority Data

Oct. 19, 2017  (JP) .............................. JP2017-202360

(51) Int. Cl.
*F16H 61/06*    (2006.01)
*F16H 59/68*    (2006.01)
*F16H 61/00*    (2006.01)

(52) U.S. Cl.
CPC .......... *F16H 61/061* (2013.01); *F16H 59/68* (2013.01); *F16H 61/0021* (2013.01);
(Continued)

(58) Field of Classification Search
CPC .. F16H 61/061; F16H 61/0021; F16H 61/062; F16H 59/68; F16H 59/6807; F16H 59/683
See application file for complete search history.

(56) References Cited

U.S. PATENT DOCUMENTS 4,707,789 A    11/1987  Downs et al.
5,285,880 A    2/1994   Minanaga et al.
(Continued)

FOREIGN PATENT DOCUMENTS

CN    101956819 A    1/2011
CN    102164797 A    8/2011
(Continued)

OTHER PUBLICATIONS

China National Intellectual Property Administration, Office Action and Search Report Issued in Application No. 201880067794.X, dated Nov. 3, 2020, 7 pages. Submitted with English summary.
(Continued)

*Primary Examiner* — David R Morris
(74) *Attorney, Agent, or Firm* — Alleman Hall Creasman & Tuttle LLP

(57) ABSTRACT

A shift control device for an automatic transmission includes: an engagement control unit that controls an engagement hydraulic pressure supplied to an engagement hydraulic chamber of an engagement side friction element; a hydraulic pressure detecting unit that detects the engagement hydraulic pressure; a reference setting unit that calculates a predicted value of the engagement hydraulic pressure during shifting, based on a rising characteristic of the engagement hydraulic pressure from when supply of the engagement hydraulic pressure is started to when engagement of the engagement side friction element is started, and sets the predicted value as a reference hydraulic pressure; and an engagement start detecting unit that detects an
(Continued)

engagement start time point of the engagement side friction element, based on a difference between the hydraulic pressure detected by the hydraulic pressure detecting unit during the shifting and the reference hydraulic pressure.

5 Claims, 7 Drawing Sheets

(52) U.S. Cl.
CPC ............. *F16H 2059/683* (2013.01); *F16H 2059/6807* (2013.01); *F16H 2061/062* (2013.01)

(56) References Cited

U.S. PATENT DOCUMENTS

| | | | |
|---|---|---|---|
| 5,865,708 | A | 2/1999 | Nishio et al. |
| 7,001,299 | B2 | 2/2006 | Takagi et al. |
| 2004/0248698 | A1 | 12/2004 | Takagi et al. |
| 2010/0173745 | A1 | 7/2010 | Hase et al. |
| 2010/0174429 | A1 | 7/2010 | Hase et al. |
| 2011/0015840 | A1 | 1/2011 | Takahashi et al. |
| 2011/0239804 | A1 | 10/2011 | Hase et al. |
| 2011/0246009 | A1* | 10/2011 | Hase ................ B60W 10/08 903/902 |
| 2012/0115680 | A1 | 5/2012 | Hase et al. |
| 2014/0033845 | A1 | 2/2014 | Kamada et al. |
| 2014/0200113 | A1 | 7/2014 | Kawamoto et al. |
| 2015/0051800 | A1 | 2/2015 | Kamada et al. |
| 2016/0040394 | A1 | 2/2016 | Monden et al. |
| 2018/0094722 | A1* | 4/2018 | Katakura ............ F16H 59/14 |

FOREIGN PATENT DOCUMENTS

| | | |
|---|---|---|
| CN | 102782373 A | 11/2012 |
| CN | 103261754 A | 8/2013 |
| CN | 103765052 A | 4/2014 |
| CN | 104246316 A | 12/2014 |
| CN | 105121919 A | 12/2015 |
| JP | H0517976 B2 | 3/1993 |
| JP | 2009216102 A | 9/2009 |
| JP | 5761337 B2 | 6/2015 |
| WO | 2012144207 A1 | 10/2012 |

OTHER PUBLICATIONS

European Patent Office, Extended European Search Report Issued in Application No. 18868151.4, dated Aug. 3, 2020, Germany, 7 pages.

* cited by examiner

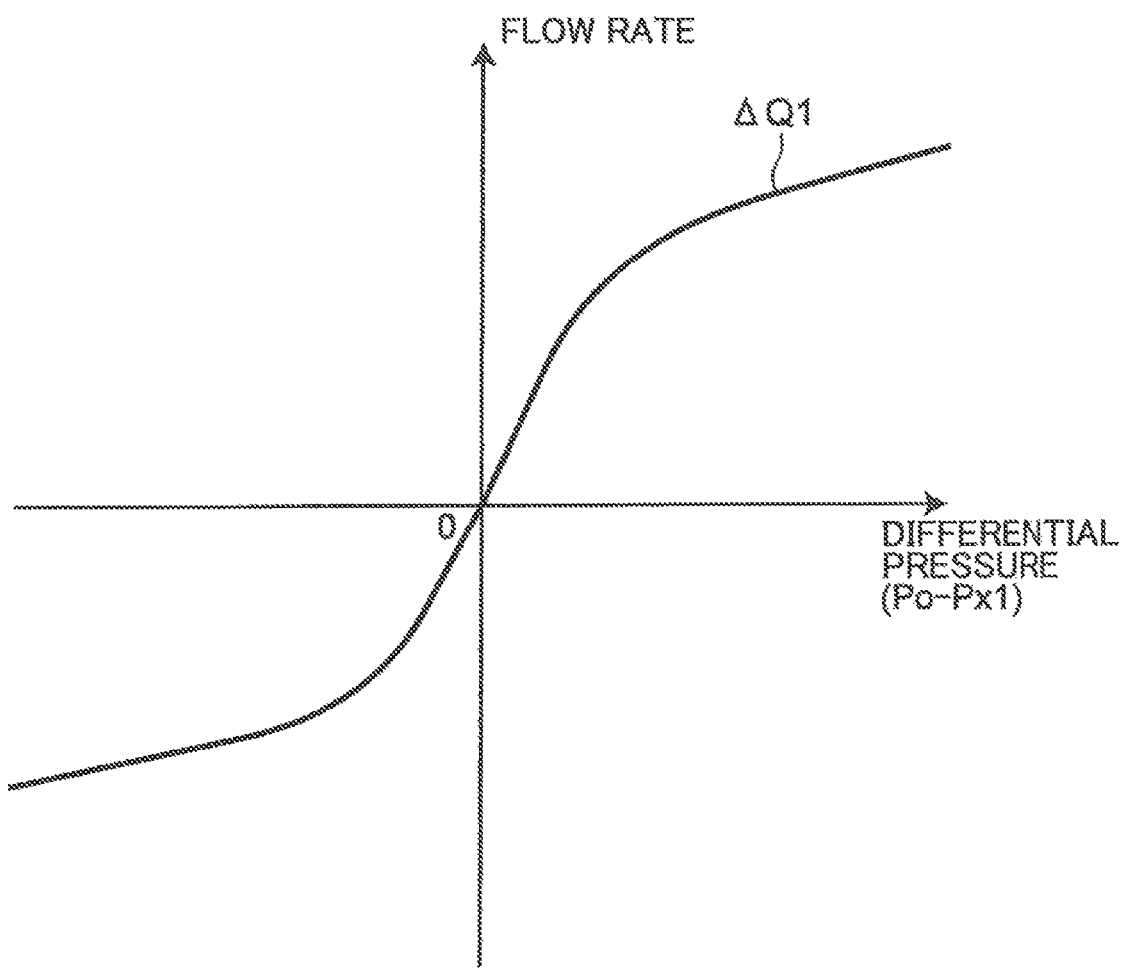

SHIFT CONTROL DEVICE FOR AUTOMATIC TRANSMISSION

TECHNICAL FIELD

The present invention relates to a shift control device for an automatic transmission mounted on a vehicle.

BACKGROUND ART

In general, a stepped automatic transmission mounted on a vehicle such as an automobile includes a transmission mechanism having a plurality of planetary gear mechanisms and a plurality of friction elements such as clutches and brakes. In this type of automatic transmission, a power transmission path via each planetary gear mechanism is switched by selectively engaging the plurality of friction elements, thereby forming a predetermined shift speed according to a driving state of the vehicle.

The friction element of the automatic transmission typically includes a plurality of friction plates, a piston that presses and engages the friction plates, and an engagement hydraulic chamber to which a hydraulic pressure that presses the piston in an engaging direction is supplied. This kind of friction element is engaged or released by supplying and discharging the hydraulic pressure to and from the engagement hydraulic chamber.

In the stepped automatic transmission, usually, each shift speed is formed by engaging the plurality of friction elements, and when shifting, so-called replacement of the friction elements is performed. In the replacement of the friction elements, one friction element in an engaged state (hereinafter, referred to as "release side friction element") is released, and one friction element in a released state (hereinafter, referred to as "engagement side friction element") is engaged.

Release control for discharging operating oil from an engagement hydraulic chamber of the release side friction element and engagement control for supplying operating oil to an engagement hydraulic chamber of the engagement side friction element are performed at the same timing. If a hydraulic pressure increase timing in the engagement control is delayed from a hydraulic pressure drop timing in the release control, a neutral state is temporarily established, which may cause a so-called blow-up phenomenon in which an engine speed temporarily increases rapidly. Conversely, if the hydraulic pressure drop timing in the release control is delayed, an interlock state is temporarily established, which may cause a so-called pull-in feeling in which output torque temporarily drops. In order to avoid such inconveniences, it is required to precisely control the timings in the release control and the engagement control during shifting.

As disclosed in Patent Literature 1, in engagement control, usually, in order to achieve both quick engagement and suppression of engagement shock (shock generated at the time of engagement), a precharge process, a hydraulic pressure holding process, and a pressure boosting process are performed in this order.

In the precharge process, an engagement hydraulic pressure supplied to an engagement hydraulic chamber of an engagement side friction element is controlled so as to rise quickly, thereby quickly filling the engagement hydraulic chamber with operating oil. In the hydraulic pressure holding process, an increase in the engagement hydraulic pressure is suppressed for a predetermined period from completion of the precharge process to a start of pressure contact between friction plates (that is, a start of substantial engagement). Thereby, the pressure contact between the friction plates is started gently, and the engagement shock is suppressed. The pressure boosting process is started when the friction plates are brought into pressure contact with each other. In the pressure boosting process, the engagement hydraulic pressure and pressure contact force (engagement force) between the friction plates gradually increase, and the engagement is eventually completed.

Further, Patent Literature 1 discloses a technique of detecting a timing at which the engagement hydraulic pressure rises to a predetermined pressure in the pressure boosting process at the time of a shift, and correcting a timing of the engagement control at a subsequent shift based on the detected timing.

More specifically, in the control of Patent Literature 1, a hydraulic switch that is turned on when the engagement hydraulic pressure is equal to or higher than the predetermined pressure is used, and a deviation between a timing at which this hydraulic switch is turned on and a timing at which a predicted value of the engagement hydraulic pressure rises to the predetermined pressure is detected. Then, based on a size of this deviation, the timing of the engagement control at the subsequent shift is corrected so that an actual increase timing of the engagement hydraulic pressure approaches the increase timing of the predicted value.

By the way, in response to the recent increase in the number of steps of an automatic transmission, there is an increasing demand for improving accuracy of hydraulic control during shifting. In order to respond to such a demand, the inventors of the present application have studied detection of a time point at which engagement is started (hereinafter referred to as "engagement start time point") during shifting and improvement of accuracy of shift control based on this detection timing.

To achieve such shift control, the technique of Patent Literature 1 using the hydraulic switch as described above has the following problems.

Generally, in the engagement side friction element, a volume (clutch volume) of the engagement hydraulic chamber increases with time due to wear of the friction plate or the like. Therefore, a stroke of a piston required for engagement and a flow rate of operating oil required for the engagement also increase with time. In addition, there is an individual difference between the automatic transmissions in the volume of the engagement hydraulic chamber or the like.

On the other hand, correction of the engagement control using a detection result of the hydraulic switch as disclosed in Patent Literature 1 is performed on the assumption that the pressure contact (substantial engagement) between the friction plates is started when the hydraulic switch is turned on. Regardless of the individual differences between the automatic transmissions and aging, in order to turn on the hydraulic switch at a timing at which the engagement is reliably started, a hydraulic pressure when the hydraulic switch is turned on must be set higher.

Under such circumstances, in the control of Patent Literature 1, a considerable amount of time has elapsed from the start of the engagement until the hydraulic switch is turned on. Therefore, there is room for improvement in accurately detecting the engagement start time point.

CITATION LIST

Patent Literature

Patent Literature 1: Japanese Patent No. 5761337

SUMMARY OF INVENTION

Therefore, an object of the present invention is to improve accuracy of shift control by increasing detection accuracy of an engagement start time point.

In order to solve the above-mentioned problems, the present invention is a shift control device for an automatic transmission provided with a release side friction element that is in an engaged state at a start of shifting and is released by an end of the shifting and an engagement side friction element that is in a released state at the start of the shifting and is engaged by the end of the shifting, the shift control device includes: an engagement control unit that controls an engagement hydraulic pressure supplied to an engagement hydraulic chamber of the engagement side friction element; a hydraulic pressure detecting unit that detects the engagement hydraulic pressure; a reference setting unit that calculates a predicted value of the engagement hydraulic pressure during the shifting, based on a rising characteristic of the engagement hydraulic pressure from when supply of the engagement hydraulic pressure to the engagement hydraulic chamber is started to when engagement of the engagement side friction element is started, and sets the predicted value as a reference hydraulic pressure; and an engagement start detecting unit that detects an engagement start time point of the engagement side friction element, based on a difference between the hydraulic pressure detected by the hydraulic pressure detecting unit during the shifting and the reference hydraulic pressure.

BRIEF DESCRIPTION OF DRAWINGS

FIG. 7 is a control map showing an example of a relationship between a differential pressure between a command pressure and a predicted hydraulic pressure related to an engagement hydraulic pressure, and a flow rate of operating oil flowing into the engagement hydraulic chamber.

DESCRIPTION OF EMBODIMENTS

Hereinafter, an embodiment of the present invention will be described with reference to the accompanying drawings.

[Overall Configuration]

Figure 1:
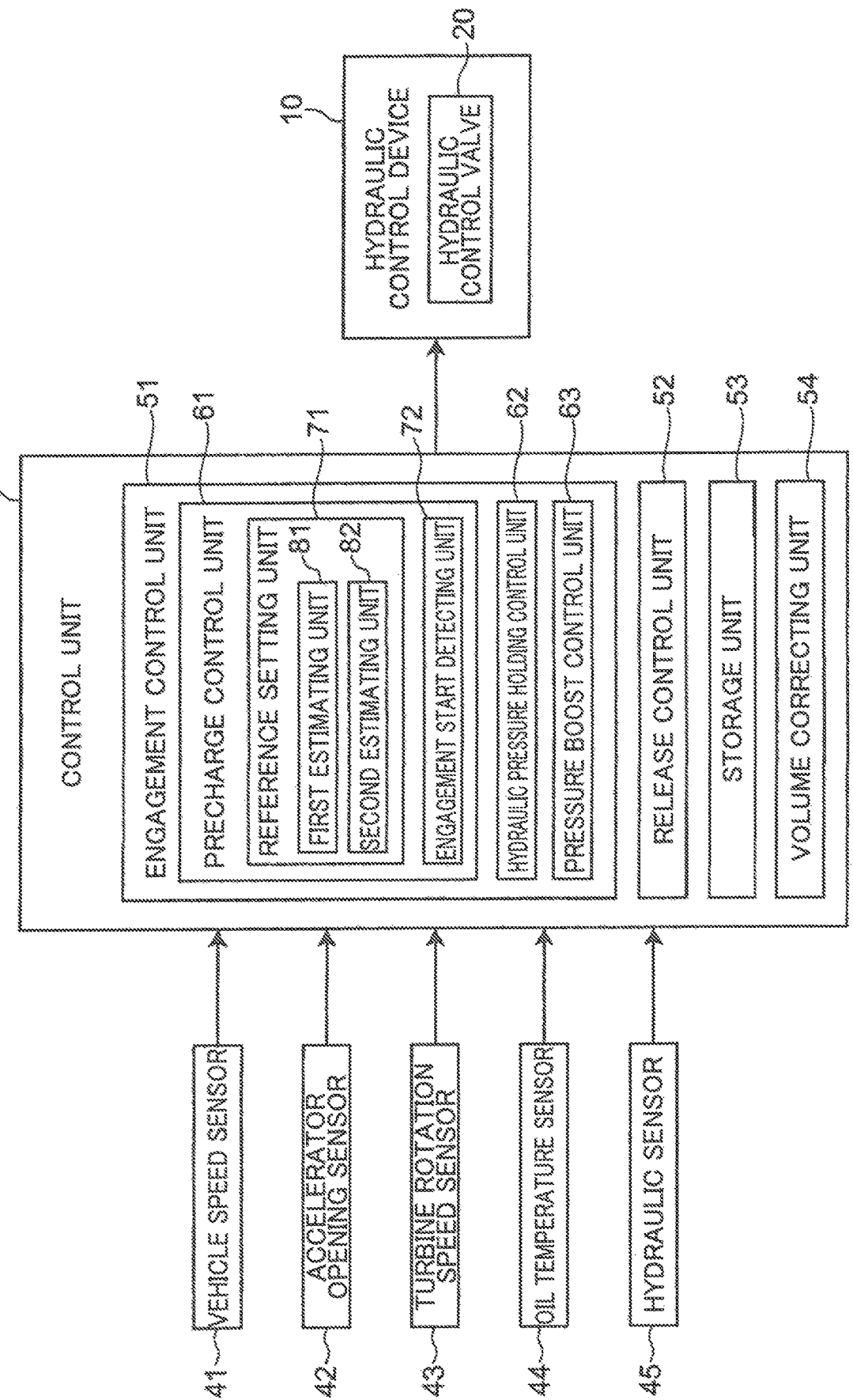
FIG. 1 is a control system diagram showing a shift control device for an automatic transmission according to an embodiment of the present invention.

As shown in FIG. 1, a shift control device 1 for an automatic transmission according to the present embodiment includes a hydraulic control device 10 used for hydraulic control of the automatic transmission (not shown) and a control unit 50 that controls an operation of the hydraulic control device 10. The hydraulic control device 10 includes a plurality of hydraulic control valves 20 (20A, 20B) described later.

The automatic transmission according to the present embodiment includes a stepped transmission mechanism. The transmission mechanism includes a plurality of planetary gear mechanisms (not shown) and a plurality of friction elements 30 (FIG. 2) such as clutches and brakes. In this automatic transmission, a power transmission path via each planetary gear mechanism is switched by selectively engaging the plurality of friction elements 30, thereby forming a predetermined shift speed according to a driving state of a vehicle.

Figure 2:
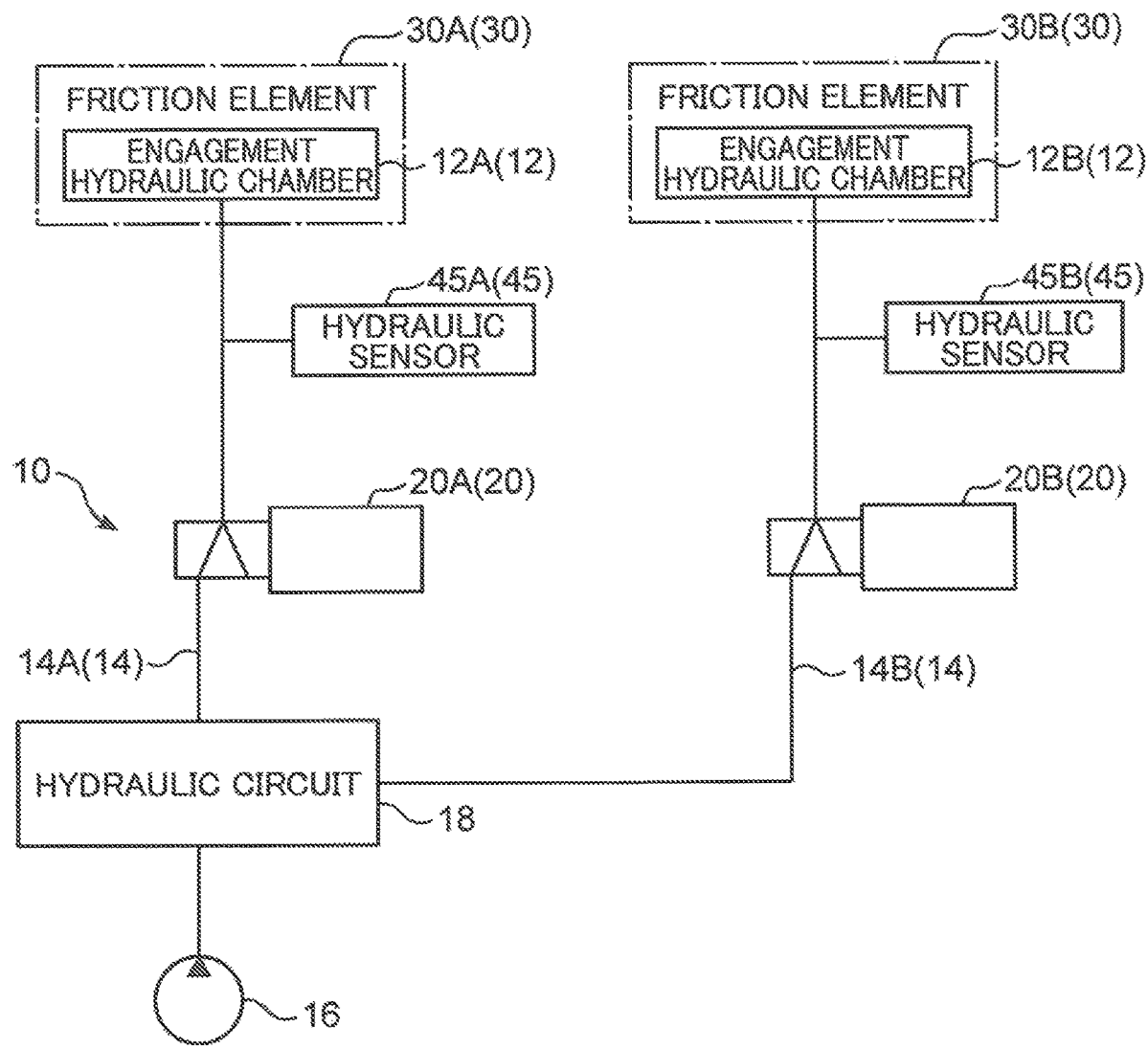
FIG. 2 is a diagram showing a hydraulic supply path to an engagement hydraulic chamber of each friction element of the automatic transmission.

As shown in FIG. 2, two friction elements representing the plurality of friction elements 30 are denoted by 30A and 30B. The friction element 30A, 30B includes friction plates (not shown), a piston (not shown) that presses and engages the friction plates, and an engagement hydraulic chamber 12A, 12B to which a hydraulic pressure that presses the piston in an engaging direction is supplied. The friction element 30A, 30B is engaged or released by supplying and discharging the hydraulic pressure to and from the engagement hydraulic chamber 12A, 12B.

Operating oil is supplied to the engagement hydraulic chamber 12A of one friction element 30A through a hydraulic supply oil path 14A. Similarly, the operating oil is supplied to the engagement hydraulic chamber 12B of the other friction element 30B through a hydraulic supply oil path 14B. A hydraulic pressure generated by an oil pump 16 as a hydraulic pressure source is supplied to each of the hydraulic supply oil paths 14A and 14B via a hydraulic circuit 18.

A hydraulic control valve 20A (20B) and a hydraulic sensor 45A (45B) are provided on the hydraulic supply oil path 14A (14B). In other words, the hydraulic control valve 20A and the hydraulic sensor 45A are provided on the hydraulic supply oil path 14A for one friction element 30A, and the hydraulic control valve 20B and the hydraulic sensor 45B are provided on the hydraulic supply oil path 14B for the other friction element 30B.

The hydraulic control valve 20A (20B) controls an engagement hydraulic pressure supplied to the engagement hydraulic chamber 12A (12B) of the friction element 30A (30B). The hydraulic control valve 20A (20B) is, for example, a linear solenoid valve. The hydraulic sensor 45A (45B) is provided between the hydraulic control valve 20A (20B) and the engagement hydraulic chamber 12A (12B) in the hydraulic supply oil path 14A (14B), and detects a magnitude of the hydraulic pressure supplied to the engagement hydraulic chamber 12A (12B).

Note that, in the following, when the plurality of friction elements including the friction elements 30A and 30B are referred to without particular distinction, they may be simply referred to as the friction element 30. The same applies to the hydraulic control valves 20A and 20B and the hydraulic sensors 45A and 45B (that is, they may be simply referred to as the hydraulic control valve 20 and the hydraulic sensor 45).

Returning to FIG. 1, the control unit 50 is constituted mainly by, for example, a microprocessor. In other words, the control unit 50 includes a central processing unit (CPU), a memory including a RAM and a ROM, and an input/output interface circuit.

The control unit 50 receives signals from various sensors. For example, a vehicle speed sensor 41 that detects a speed of the vehicle, an accelerator opening sensor 42 that detects an amount of depression of an accelerator pedal (an accelerator opening), a turbine rotation speed sensor 43 that detects a rotation speed of a turbine (an input shaft of the transmission mechanism) of a torque converter, an oil temperature sensor 44 that detects a temperature of the operating oil used for the hydraulic control of the automatic transmission, and the above-described hydraulic sensor 45 are electrically connected to the control unit 50. Information detected by the sensors 41 to 45 is input to the control unit 50 as an electric signal. Note that the hydraulic sensor 45 corresponds to a "hydraulic pressure detecting unit" in the claims.

Note that, in addition to the sensors 41 to 45, signals from various devices such as a range sensor for detecting a shift range of the automatic transmission and a brake switch for detecting depression of a brake pedal may be input to the control unit 50.

The control unit 50 outputs a control signal to the hydraulic control device 10 based on the input signals from the above various sensors to control the automatic transmission. For example, as shift control of the automatic transmission, the control unit 50 determines a target shift speed based on the vehicle speed detected by the vehicle speed sensor 41, the accelerator opening detected by the accelerator opening sensor 42, and a predetermined shift map, and controls the hydraulic control device 10 (the hydraulic control valve 20 for each friction element 30) so that the determined target shift speed is achieved.

When shifting to the target shift speed (shift control) is performed, so-called replacement of the friction elements 30 is performed. In other words, each hydraulic control valve 20 is controlled so that a specific friction element 30 that is in an engaged state at the start of shifting (a release side friction element) is released and a specific friction element 30 that is in a released state at the start of shifting (an engagement side friction element) is engaged.

Hereinafter, the friction element 30A shown in FIG. 2 will be described as the engagement side friction element, and the friction element 30B will be described as the release side friction element. In this case, as the above-described shift control, control of driving the hydraulic control valve 20B so that the hydraulic pressure in the engagement hydraulic chamber 12B of the release side friction element 30B decreases in order to release the release side friction element 30B that is in the engaged state at the start of shifting, and control of driving the hydraulic control valve 20A so that the hydraulic pressure in the engagement hydraulic chamber 12A of the engagement side friction element 30A increases in order to engage the engagement side friction element 30A that is in the released state at the start of shifting are performed in parallel. Here, a combination of the friction elements that are engaged or released to achieve each shift speed differs depending on the shift speed. For this reason, the engagement side friction element 30A and the release side friction element 30B are not limited to specific friction elements, and are appropriately switched among the plurality of friction elements included in the automatic transmission according to the shift speed.

The control unit 50 functionally includes an engagement control unit 51 that controls the engagement side friction element 30A, a release control unit 52 that controls the release side friction element 30B, a storage unit 53 that stores various information including a volume of the engagement hydraulic chamber 12A, 12B of the friction element 30A, 30B (hereinafter, also referred to as "clutch volume"), and a volume correcting unit 54 that corrects the information on the clutch volumes stored in the storage unit 53.

The engagement control unit 51 controls the engagement hydraulic pressure supplied to the engagement hydraulic chamber 12A of the engagement side friction element 30A based on the clutch volume stored in the storage unit 53 (hereinafter, this is also referred to as "engagement control"). The engagement control is performed by controlling an opening of the hydraulic control valve 20A. In the engagement control, a precharge process, a hydraulic pressure holding process, and a pressure boosting process are performed in this order. For this reason, the engagement control unit 51 functionally includes a precharge control unit 61 that controls the precharge process, a hydraulic pressure holding control unit 62 that controls the hydraulic pressure holding process, and a pressure boost control unit 63 that controls the pressure boosting process.

In order to quickly fill the engagement hydraulic chamber 12A with operating oil during the precharge process, the precharge control unit 61 controls the hydraulic control valve 20A such that the engagement hydraulic pressure quickly increases. The precharge control unit 61 can control a length of the precharge process (hereinafter, also referred to as "precharge time Tp" (see FIG. 5)), whereby a timing at which engagement of the engagement side friction element 30A is started after the precharge process is controlled.

The precharge control unit 61 performs correction control for correcting the precharge time Tp to be extended or shortened at the time of subsequent engagement control. This correction control is performed, for example, for each engagement control, but need not always be performed every time. A control operation of the correction control will be described later.

In order to perform the correction control, the precharge control unit 61 functionally includes a reference setting unit 71 and an engagement start detecting unit 72. Further, the reference setting unit 71 functionally includes a first estimating unit 81 and a second estimating unit 82. Each configuration of the reference setting unit 71, the engagement start detecting unit 72, the first estimating unit 81, and the second estimating unit 82 will be described later along with flows of a control operation of the engagement control shown in FIG. 3 and the control operation of the correction control shown in FIG. 4.

The hydraulic pressure holding control unit 62 controls the hydraulic control valve 20A so as to suppress an increase in the engagement hydraulic pressure during the hydraulic pressure holding process. The hydraulic pressure holding process is performed during a period from a time point at which the precharge process ends to an engagement start time point of the engagement side friction element 30A. In the present embodiment, a length of the hydraulic pressure holding process (hereinafter, also referred to as "hydraulic pressure holding time Th" (see FIG. 5)) is set to a predetermined target time. However, an actual length of the hydraulic pressure holding process (hereinafter, also referred to as "actual time T") may be longer or shorter than the target time Th depending on a deviation of the engagement start time point.

In the hydraulic pressure holding process, the engagement hydraulic pressure may be gradually increased, or may be maintained at a constant pressure. Engagement shock is suppressed by starting the engagement of the engagement side friction element 30A in a state in which the increase in the engagement hydraulic pressure is suppressed in the hydraulic pressure holding process.

The pressure boost control unit 63 controls the hydraulic control valve 20A so that the engagement hydraulic pressure increases during the pressure boosting process. In the pressure boosting process, engagement force of the engagement side friction element 30A (pressure contact force between the friction plates) increases in accordance with the increase in the engagement hydraulic pressure. Note that, in the pressure boosting process, immediately before the engagement of the engagement side friction element 30A is completed, the engagement hydraulic pressure may be controlled so that a flow rate of the operating oil supplied to the engagement hydraulic chamber 12A is reduced. Thereby, shock at the time of completion of the engagement is suppressed.

The release control unit 52 controls a hydraulic pressure Ro (see FIG. 5) of the engagement hydraulic chamber 12B so that the operating oil is discharged from the engagement hydraulic chamber 12B of the release side friction element 30B (hereinafter, also referred to as "release control"). The release control is performed by controlling an opening of the hydraulic control valve 20B corresponding to the release side friction element 30B.

In the release control, for example, a release preparation process of gently lowering the hydraulic pressure of the engagement hydraulic chamber 12B of the release side friction element 30B and a release execution process of rapidly reducing the hydraulic pressure so as to quickly discharge the operating oil from the engagement hydraulic chamber 12B are performed in this order. The release preparation process is performed in parallel with the precharge process and the hydraulic pressure holding process of the engagement control. The release execution process is performed in parallel with the pressure boosting process of the engagement control.

The release execution process is started at an appropriate timing according to the engagement start time point in the engagement control (a timing at which the hydraulic pressure holding process ends and the pressure boosting process is started). As a result, a temporary interlock state and a temporary neutral state during shifting are avoided.

The information on the clutch volumes stored in the storage unit 53 is appropriately updated by correction by the volume correcting unit 54. The volume correcting unit 54 corrects the clutch volume of the engagement side friction element 30A at the time of shifting, and causes the storage unit 53 to store the corrected clutch volume. The correction of the clutch volume of the engagement side friction element 30A by the volume correcting unit 54 is performed, for example, every time the engagement control is performed, but is not necessarily performed every time.

A specific correction method by the volume correcting unit 54 will be described later together with the flows of the control operation of the engagement control shown in FIG. 3 and the control operation of the correction control shown in FIG. 4.

[Control Operation of Engagement Control]

Details of the engagement control by the engagement control unit 51 will be described mainly with reference to a flowchart shown in FIG. 3.

First, in step S1, various information related to the engagement control is read. In step S2, it is determined whether there is a shift command. As a result of the determination in step S2, when it is confirmed that the shift command is issued, in step S3, a command pressure Po, which is a target value (command value) of the engagement hydraulic pressure of the engagement side friction element 30A, is set.

Figure 5:
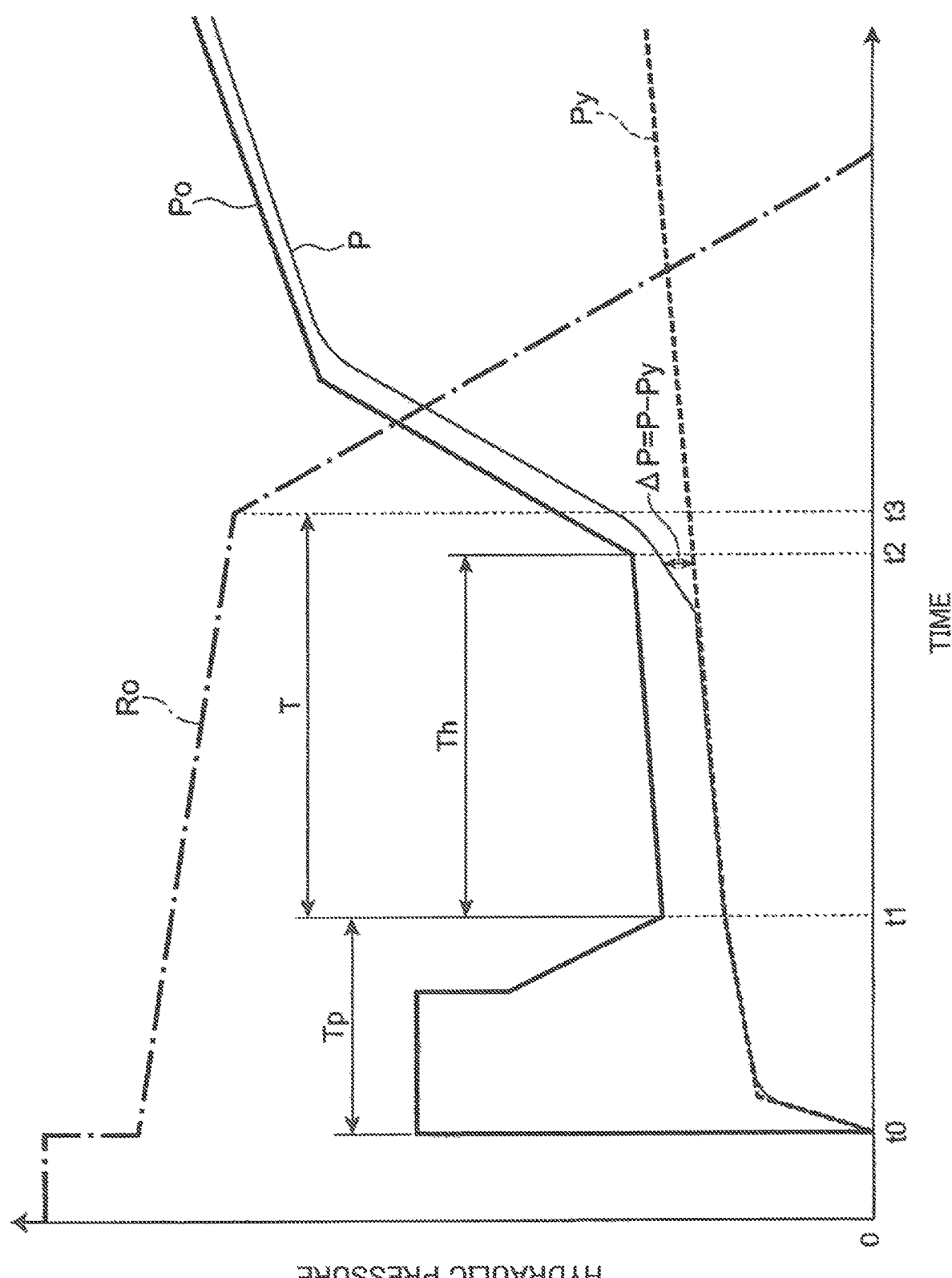
FIG. 5 is a time chart showing an example of transition of a hydraulic pressure during shifting.

As shown in FIG. 5, the command pressure Po is set to different values in a precharge process from a time point t0 when the shift command is issued to a time point t1, a hydraulic pressure holding process from the time point t1 to a time point t2, and a pressure boosting process after the time point t2. The command pressure Po in the precharge process (from the time point t0 to the time point t1) is set so as to rise to a predetermined peak value immediately after the start of the precharge process. The command pressure Po in the hydraulic pressure holding process (from the time point t1 to the time point t2) is set so as to be stable at a value lower than the peak value of the command pressure Po in the precharge process. The command pressure Po in the pressure boosting process (after the time point t2) is set so as to continuously increase to a target hydraulic pressure sufficiently higher than the command pressure Po in the hydraulic pressure holding process. A length of each process and a magnitude of the command pressure Po are set based on the clutch volumes stored in the storage unit 53.

The peak value of the command pressure Po in the precharge process is set to, for example, a predetermined fixed value. The precharge time Tp is set to a time corrected by the correction control (see step S6 in FIG. 3 and FIG. 4) finally performed for the same friction element. A configuration of the correction control will be described later.

The command pressure Po in the hydraulic pressure holding process is set to a value lower than the peak value of the command pressure Po in the precharge process (for example, a value about half of the peak value), and to gradually increase or remain at a constant level. The command pressure Po and the hydraulic pressure holding time Th in the hydraulic pressure holding process are set to predetermined fixed values.

The command pressure Po in the pressure boosting process is set so as to increase at a sharper speed than in the hydraulic pressure holding process and is set so that an increase speed of the command pressure Po decreases in the middle of the pressure boosting process. The command pressure Po at the time of completion of the engagement (that is, a final target pressure of the engagement hydraulic chamber 12A) is set to a value according to transmission torque of the engagement side friction element 30A and the like, based on, for example, output values of the accelerator opening sensor 42 and the turbine rotation speed sensor 43.

Returning to FIG. 3, in step S4, a reference hydraulic pressure Py is set by the reference setting unit 71. The reference hydraulic pressure Py is used in the correction control (see step S6 in FIG. 3 and FIG. 4) described later, and is set based on a predicted value of the engagement hydraulic pressure (hereinafter, referred to as "predicted hydraulic pressure Px") estimated by the first estimating unit 81.

Figure 6:
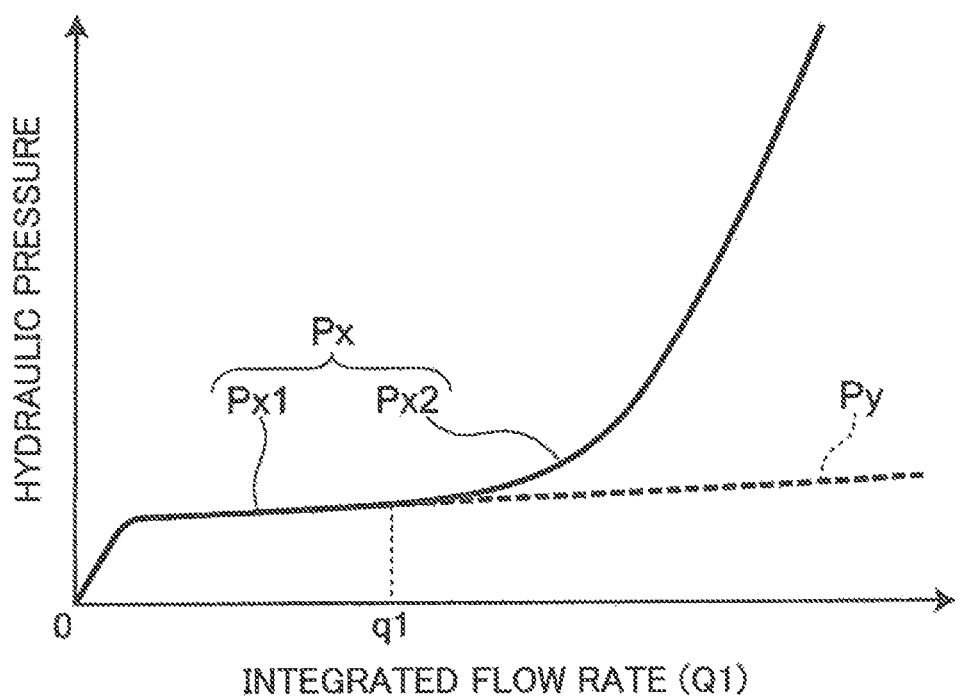
FIG. 6 is a control map showing an example of a rising characteristic of an engagement hydraulic pressure during engagement control.

The predicted hydraulic pressure Px is estimated based on a rising characteristic of the engagement hydraulic pressure during the engagement control of the engagement side friction element 30A. FIG. 6 is a control map showing an example of the rising characteristic of the engagement hydraulic pressure during the engagement control of the engagement side friction element 30A. More specifically, the control map of FIG. 6 defines a relationship between an integrated flow rate Q1 of the operating oil supplied to the engagement hydraulic chamber 12A of the engagement side friction element 30A during the engagement control and the predicted hydraulic pressure Px.

In the control map shown in FIG. 6, a rising curve of the predicted hydraulic pressure Px has an inflection point at a position corresponding to a time point at which the integrated flow rate Q1 reaches a predetermined amount q1. In other words, the rising characteristic of the predicted hydraulic pressure Px is divided into a first characteristic when the integrated flow rate Q1 is less than the predetermined amount q1 and a second characteristic when the integrated flow rate Q1 is equal to or more than the predetermined amount q1.

The time point at which the integrated flow rate Q1 reaches the predetermined amount q1 corresponds to the time point at which the engagement of the engagement side friction element 30A is started. In other words, the first characteristic is a rising characteristic of the engagement hydraulic pressure from when the engagement control (supply of the engagement hydraulic pressure) is started to when the engagement of the engagement side friction element 30A is started. During a period corresponding to the first characteristic, resistance acting on the operating oil is mainly flow resistance (resistance generated when the operating oil flows through the oil path). On the other hand, the second characteristic is a rising characteristic of the engagement hydraulic pressure from when the engagement of the engagement side friction element 30A is started to when the engagement control is completed. During a period corresponding to the second characteristic, the resistance acting on the operating oil includes not only the above-mentioned flow resistance, but also resistance (reaction force) received from the rigid friction plates. For this reason, a rising speed of the engagement hydraulic pressure in the second characteristic is faster than a rising speed thereof in the first characteristic.

The first estimating unit 81 sequentially calculates a first predicted hydraulic pressure Px1 when the integrated flow rate Q1 is less than the predetermined amount q1 based on the first characteristic shown in FIG. 6, and sequentially calculates a second predicted hydraulic pressure Px2 when the integrated flow rate Q1 is equal to or more than the predetermined amount q1 based on the second characteristic shown in FIG. 6. The first estimating unit 81 checks a transition of the integrated flow rate Q1 during the engagement control in order to calculate the first predicted hydraulic pressure Px1 and the second predicted hydraulic pressure Px2.

The transition of the integrated flow rate Q1 is checked based on, for example, a control map shown in FIG. 7. FIG. 7 is a map showing a flow rate characteristic of the operating oil until the integrated flow rate Q1 reaches the predetermined amount q1 (see FIG. 6), and is used to calculate an engagement hydraulic pressure (that is, the first predicted hydraulic pressure Px1) during the period corresponding to the first characteristic. More specifically, the control map of FIG. 7 defines a relationship between a differential pressure (Po−Px1) between the command pressure Po and the first predicted hydraulic pressure Px1 and a flow rate ΔQ1 per unit time of the operating oil flowing into the engagement hydraulic chamber 12A. As shown in FIG. 7, the flow rate ΔQ1 per unit time is set to increase as the differential pressure (Po−Px1) is larger, that is, as the first predicted hydraulic pressure Px1 is lower than the command pressure Po.

At the start of the engagement control, the first predicted hydraulic pressure Px1 is zero. Therefore, at the start of the engagement control, the differential pressure (Po−Px1) between the command pressure Po and the first predicted hydraulic pressure Px1 is equal to the command pressure Po of the engagement hydraulic pressure. Therefore, at the start of the engagement control, the command pressure Po of the engagement hydraulic pressure is applied to the control map of FIG. 7 as the differential pressure, and the flow rate ΔQ1 corresponding to this differential pressure (=Po) is directly calculated as the integrated flow rate Q1. Then, the first predicted hydraulic pressure Px1 immediately after the start of the engagement control is calculated based on the obtained integrated flow rate Q1 and the control map shown in FIG. 6.

Thereafter, the flow rate ΔQ1 is calculated based on the first predicted hydraulic pressure Px1 calculated as described above, the command pressure Po, and the control map of FIG. 7, and this flow rate ΔQ1 is added to the immediately preceding integrated flow rate Q1. Thus, the integrated flow rate Q1 is updated. Subsequently, the first predicted hydraulic pressure Px1 is updated based on the updated integrated flow rate Q1 and the control map shown in FIG. 6. Such a series of calculations is repeated until the integrated flow rate Q1 reaches the predetermined amount q1, whereby a transition of the first predicted hydraulic pressure Px1 is calculated.

A transition of the second predicted hydraulic pressure Px2 is calculated in the same manner as the above-described transition of the first predicted hydraulic pressure Px1, using a flow rate characteristic map different from the control map shown in FIG. 7. Thereby, a transition of the predicted hydraulic pressure Px including the first predicted hydraulic pressure Px1 and the second predicted hydraulic pressure Px2 is obtained.

The second estimating unit 82 calculates the reference hydraulic pressure Py based on the first predicted hydraulic pressure Px1 calculated by the first estimating unit 81. The calculation of the reference hydraulic pressure Py by the second estimating unit 82 is performed on the assumption that, even after the engagement of the engagement side friction element 30A is started, that is, even after the integrated flow rate Q1 reaches the predetermined amount q1 (see FIG. 6), the rising characteristic of the engagement hydraulic pressure does not change, and the engagement hydraulic pressure increases according to the first characteristic. In other words, the reference hydraulic pressure Py is calculated on the assumption that the rising speed of the engagement hydraulic pressure immediately before the start of engagement of the engagement side friction element 30A is maintained until the completion of the engagement control.

That is to say, the second estimating unit 82 calculates the predicted value Py of the engagement hydraulic pressure from the start to the completion of the engagement control based on only the first characteristic. In other words, when calculating the predicted value Py, not only when the integrated flow rate Q1 is less than the predetermined amount q1, but also when the integrated flow rate Q1 is equal to or more than the predetermined amount q1, a method similar to the method of calculating the first predicted hydraulic pressure Px1 using the control maps of FIGS. 6 and 7 is employed. The second estimating unit 82 sets the predicted value calculated in this way as the reference hydraulic pressure Py.

As shown in FIG. 5, the reference hydraulic pressure Py set by the second estimating unit 82 of the reference setting unit 71 is preferably set to substantially equal to an actual engagement hydraulic pressure (hereinafter, also referred to as "actual hydraulic pressure") before the start of the engagement. In order to achieve a match between the actual hydraulic pressure P and the reference hydraulic pressure Py before the start of the engagement, the first estimating unit 81 performs appropriate correction so as to substantially match a magnitude and a rising speed of the above-described first predicted hydraulic pressure Px1 (see FIG. 6) with those of the actual hydraulic pressure P detected by the hydraulic sensor 45A (see FIG. 2).

Returning to FIG. 3 again, in step S5, the engagement hydraulic pressure supplied to the engagement hydraulic chamber 12A of the engagement side friction element 30A is controlled according to the command pressure Po set in step S3 (engagement control). Specifically, the hydraulic control valve 20A is controlled such that the engagement hydraulic pressure increases in accordance with the command pressure Po.

However, as shown in FIG. 5, the actual hydraulic pressure P rises later than the command pressure Po. Therefore, until the engagement control is completed (until the engagement side friction element 30A is completely engaged), a state in which the actual hydraulic pressure P is lower than the command pressure Po is continued.

Figure 3:
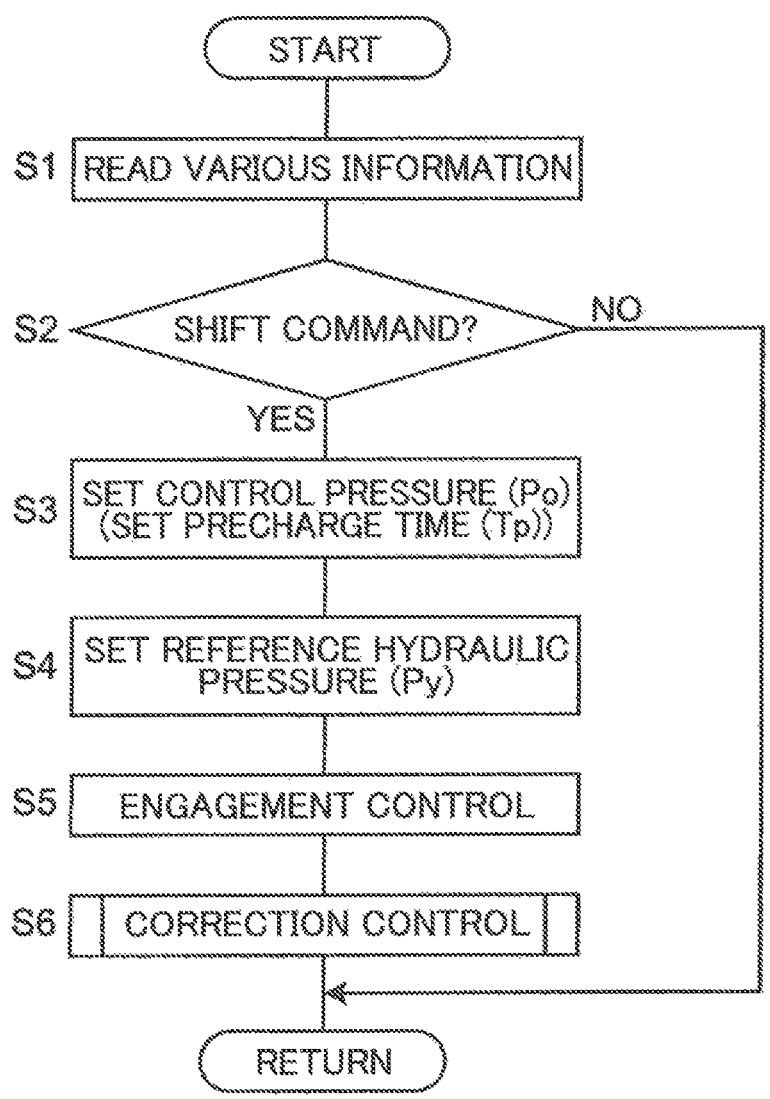
FIG. 3 is a flowchart illustrating an example of a flow of engagement control.

As shown in FIG. 3, during execution of the engagement control in step S5, the correction control in step S6 is executed.

[Correction Control]

Hereinafter, details of the correction control (S6) will be described with reference to a flowchart shown in FIG. 4.

First, in step S11, the actual hydraulic pressure P is detected by the hydraulic sensor 45A (see FIG. 2). Further, in step S12, it is determined whether or not a differential pressure ΔP (P−Py) between the actual hydraulic pressure P detected in step S11 and the reference hydraulic pressure Py set in step S4 in FIG. 3 is equal to or greater than a predetermined value P1.

Processing in step S12 is processing for detecting whether or not the engagement of the engagement side friction element 30A is started from a difference between the reference hydraulic pressure Py and the actual hydraulic pressure P, by utilizing a fact that the rising characteristic of the engagement hydraulic pressure changes at the start of the engagement of the engagement side friction element 30A (changes from the first characteristic to the second characteristic having the faster rising speed). Therefore, the predetermined value P1 in step S12 is set to a value as low as possible within a limit that can guarantee accuracy of determining the start of the engagement of the engagement side friction element 30A.

As a result of the determination in step S12, when the differential pressure ΔP (P−Py) between the actual hydraulic pressure P and the reference hydraulic pressure Py reaches the predetermined value P1 or more, in step S13, the engagement start detecting unit 72 detects a time point at which the differential pressure ΔP (P−Py) reaches the predetermined value P1 as the time point at which the engagement of the engagement side friction element 30A is started. Note that, in the example of FIG. 5, the time point at which the differential pressure ΔP (P−Py) reaches the predetermined value P1 is defined as t3.

Note that, strictly speaking, at the time point at which the differential pressure ΔP (P−Py) reaches the predetermined value P1, a little time has passed since the engagement of the engagement side friction element 30A is started, but in the control of the present embodiment, the time point at which the differential pressure ΔP (P−Py) reaches the predetermined value P1 is regarded as the engagement start time point. However, based on a timing at which the differential pressure ΔP (P−Py) reaches the predetermined value P1, the engagement start detecting unit 72 may detect a timing shifted by a predetermined time from the timing as the engagement start time point.

When the engagement start time point of the engagement side friction element 30A is detected in step S13, the actual time T of the hydraulic pressure holding process is calculated in step S14. The actual time T is an elapsed time (t3−t1) from a time point at which the hydraulic pressure holding process is started according to the command pressure Po (time point t1 in FIG. 5) to the engagement start time point detected in step S13 (time point t3 in FIG. 5).

In the following step S15, a time difference ΔT between the target time Th of the hydraulic pressure holding step set by the hydraulic pressure holding control unit 62 and the actual time T calculated in step S14 is calculated. Note that, here, the time difference ΔT means an absolute value (|Th−T|) of a value obtained by subtracting the actual time T from the target time Th. The time difference ΔT (|Th−T|) is equal to a time difference (|t2−t3|) between the time point at which the hydraulic pressure holding process ends according to the command pressure Po, that is, a predicted engagement start time point (time point t2 in FIG. 5), and the engagement start time point detected in step S13 (time point t3 in FIG. 5).

In step S16, a magnitude relationship between the target time Th and the actual time T of the hydraulic pressure holding process is determined.

As a result of the determination in step S16, if the actual time T is longer than the target time Th, that is, the engagement start time point (time point t3 in FIG. 5) detected in step S13 is later than the predicted engagement start time point (time point t2 in FIG. 5), correction in steps S17 and S18 relating to subsequent engagement control is executed. Note that FIG. 5 illustrates a case where the engagement start time point (t3) is actually later than the predicted engagement start time point (t2).

In step S17, the volume correcting unit 54 performs processing of correcting the clutch volume stored in the storage unit 53 in an increasing direction. An increase correction amount of the clutch volume in step S17 is increased as the time difference ΔT (|Th−T1|) calculated in step S15 is larger.

In step S18, the precharge control unit 61 performs processing of correcting the precharge time Tp for the subsequent engagement control in an extending direction. A correction amount (an extended time) of the precharge time Tp in step S18 is set depending on the increase correction amount of the clutch volume in step S17 (that is, the larger the increase correction amount, the longer the precharge time Tp). Thereby, in the subsequent engagement control, supply of the operating oil to the engagement hydraulic chamber 12A in the precharge process is further promoted, so that the engagement start time point (t3) can be earlier than that in the current engagement control.

On the other hand, as a result of the determination in step S16, if the actual time T is equal to or less than the target time Th, that is, the engagement start time point (t3) detected in step S13 is the same as or earlier than the predicted engagement start time point (t2), correction in steps S19 and S20 relating to subsequent engagement control is performed.

In step S19, the volume correcting unit 54 is performs processing of correcting the clutch volume stored in the storage unit 53 in a decreasing direction. A decrease correction amount of the clutch volume in step S19 is increased as the time difference ΔT (|Th−T|) calculated in step S15 is larger.

In step S20, the precharge control unit 61 performs processing of correcting the precharge time Tp for the subsequent engagement control in a shortening direction. A correction amount (shortened time) of the precharge time Tp in step S20 is set depending on the decrease correction amount of the clutch volume in step S19 (that is, the larger the decrease correction amount, the shorter the precharge time Tp). Thereby, in the subsequent engagement control, supply of the operating oil to the engagement hydraulic chamber 12A in the precharge process is suppressed, so that the engagement start time point (t3) can be delayed as compared with that in the current engagement control.

Note that each correction in steps S17 to S20 may be performed so as to completely eliminate the time difference ΔT (|Th−T|) calculated in step S15, or may be performed so as to eliminate a part of the time difference ΔT (|Th−T|).

Further, a timing of the release control may be corrected according to the correction in steps S17 to S20. In this case, for example, a timing of the release execution process is corrected so as to match a timing of the pressure boosting process of the engagement control. Thereby, a temporary interlock state and a temporary neutral state during shifting can be effectively avoided.

As described above, according to the correction control of the present embodiment, the difference between the actual hydraulic pressure P detected by the hydraulic sensor 45A and the reference hydraulic pressure Py is calculated, and the engagement start time point of the engagement side friction element 30A is detected (step S13 in FIG. 4) based on the difference. Thus, detection accuracy at the engagement start time point can be improved.

Figure 4:
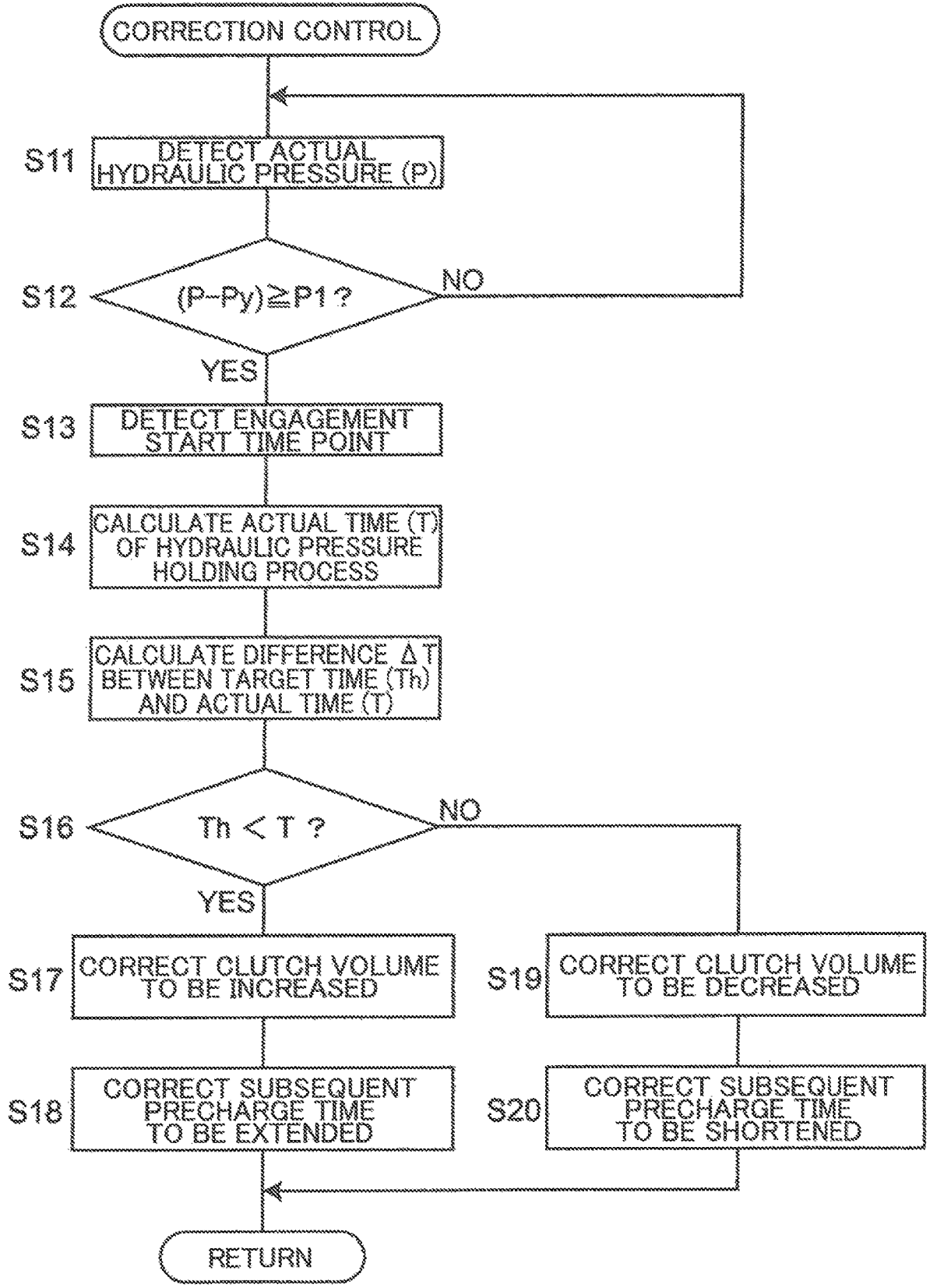
FIG. 4 is a flowchart showing an example of a flow of correction control.

Further, based on a deviation between the engagement start time point and the predicted engagement start time point detected with high accuracy as described above, the clutch volume and the precharge time Tp can be accurately corrected (steps S17 to S20 in FIG. 4). Thereby, accuracy of the engagement control, and consequently accuracy of the shift control can be effectively increased.

The preferred embodiment of the present invention has been described above, but the present invention is not limited to the above-described embodiment.

For example, in the above embodiment, the correction amount of the clutch volume is determined based on the deviation between the engagement start time point and the predicted engagement start time point (steps S17 and S19 in FIG. 4), and the correction amount of the precharge time Tp is determined based on the determined correction amount of the clutch volume (steps S18 and S20 in FIG. 4). However, for example, by using a control map that defines a relationship between the engagement start time point and the precharge time Tp, the correction amount of the precharge time Tp may be determined directly from the engagement start time point detected in step S13 in FIG. 4.

Further, in the above-described embodiment, the engagement start time point in the subsequent engagement control is adjusted by correcting the precharge time Tp, but the engagement start time point can be adjusted by correcting another control amount. For example, the engagement start time point may be adjusted by correcting the peak value of the engagement hydraulic pressure in the precharge process.

Summary of Embodiment

The above embodiment is summarized as follows.

The shift control device according to the above embodiment is applied to an automatic transmission provided with a release side friction element that is in an engaged state at the start of shifting and is released by the end of the shifting and an engagement side friction element that is in a released state at the start of the shifting and is engaged by the end of the shifting. This shift control device includes: an engagement control unit that controls an engagement hydraulic pressure supplied to an engagement hydraulic chamber of the engagement side friction element; a hydraulic pressure detecting unit that detects the engagement hydraulic pressure; a reference setting unit that calculates a predicted value of the engagement hydraulic pressure during the shifting, based on a rising characteristic of the engagement hydraulic pressure from when supply of the engagement hydraulic pressure to the engagement hydraulic chamber is started to when engagement of the engagement side friction element is started, and sets the predicted value as a reference hydraulic pressure; and an engagement start detecting unit that detects an engagement start time point of the engagement side friction element, based on a difference between the hydraulic pressure detected by the hydraulic pressure detecting unit during the shifting and the reference hydraulic pressure.

According to this shift control device, at the time of shifting of the automatic transmission, based on the difference between the reference hydraulic pressure set based on the rising characteristic of the engagement hydraulic pressure from when the supply of the engagement hydraulic pressure is started to when the engagement of the engagement side friction element is started and the hydraulic pressure detected by the hydraulic pressure detecting unit, the engagement start time point of the engagement side friction element can be accurately detected. Also, accuracy of shift control can be improved, by using information on the engagement start time point detected with high accuracy in this way.

Preferably, the engagement start detecting unit detects the engagement start time point, based on a timing at which the difference between the hydraulic pressure detected by the hydraulic pressure detecting unit and the reference hydraulic pressure reaches a predetermined value.

According to this configuration, the engagement start time point can be accurately detected based on the timing at which the difference between the detected hydraulic pressure and the reference hydraulic pressure reaches the predetermined value.

Preferably, the shift control device includes a storage unit that stores a volume of the engagement hydraulic chamber, and a volume correcting unit that corrects the volume stored in the storage unit based on the engagement start time point detected by the engagement start detecting unit.

According to this configuration, the volume of the engagement hydraulic chamber of the engagement side friction element stored in the storage unit can be accurately corrected based on the engagement start time point detected with high accuracy as described above. Therefore, more accurate information on the volume of the engagement hydraulic chamber can be obtained, and the accuracy of the shift control can be improved using this information.

In the above configuration, more preferably, the engagement control unit includes a precharge control unit that controls a precharge process of filling the engagement hydraulic chamber with operating oil before the engagement of the engagement side friction element is started based on the volume stored in the storage unit, and the precharge control unit changes a length of the precharge process according to volume correction by the volume correcting unit.

According to this configuration, the length of the precharge process can be appropriately changed based on more accurate information on the volume of the engagement hydraulic chamber, so that the accuracy of the shift control can be improved.

The engagement control unit may include a precharge control unit that controls a precharge process of filling the engagement hydraulic chamber with operating oil before the engagement of the engagement side friction element is started, and the precharge control unit may change a length of the precharge process based on the engagement start time point detected by the engagement start detecting unit.

According to this configuration, the length of the precharge process can be appropriately changed based on the engagement start time point detected with high accuracy as described above, so that the accuracy of the shift control can be improved.

INDUSTRIAL APPLICABILITY

As described above, according to the present invention, accuracy of shift control can be improved by increasing detection accuracy at an engagement start time point of an engagement side friction element, so that there is a possibility that the present invention will be suitably used in a stepped automatic transmission and a manufacturing industry of an automobile equipped with this.

The invention claimed is:

1. A shift control device for an automatic transmission provided with a release side friction element that is in an engaged state at a start of shifting and is released by an end of the shifting and an engagement side friction element that is in a released state at the start of the shifting and is engaged by the end of the shifting, the shift control device comprising:
    an engagement control unit that controls an engagement hydraulic pressure supplied to an engagement hydraulic chamber of the engagement side friction element;
    a hydraulic pressure detecting unit that detects the engagement hydraulic pressure;
    a reference setting unit that calculates a predicted value of the engagement hydraulic pressure during the shifting, based on a rising characteristic of the engagement hydraulic pressure from when supply of the engagement hydraulic pressure to the engagement hydraulic chamber is started to when engagement of the engagement side friction element is started, and sets the predicted value as a reference hydraulic pressure; and
    an engagement start detecting unit that detects an engagement start time point of the engagement side friction element, based on a difference between the hydraulic pressure detected by the hydraulic pressure detecting unit during the shifting and the reference hydraulic pressure.

2. The shift control device for the automatic transmission according to claim 1, wherein the engagement start detecting unit detects the engagement start time point, based on a timing at which the difference between the hydraulic pressure detected by the hydraulic pressure detecting unit and the reference hydraulic pressure reaches a predetermined value.

3. The shift control device for the automatic transmission according to claim 1, further comprising:
    a storage unit that stores a volume of the engagement hydraulic chamber; and
    a volume correcting unit that corrects the volume stored in the storage unit based on the engagement start time point detected by the engagement start detecting unit.

4. The shift control device for the automatic transmission according to claim 3, wherein
    the engagement control unit includes a precharge control unit that controls a precharge process of filling the engagement hydraulic chamber with operating oil before the engagement of the engagement side friction element is started, based on the volume stored in the storage unit, and
    the precharge control unit changes a length of the precharge process according to volume correction by the volume correcting unit.

5. The shift control device for the automatic transmission according to claim 1, wherein
    the engagement control unit includes a precharge control unit that controls a precharge process of filling the engagement hydraulic chamber with operating oil before the engagement of the engagement side friction element is started, and
    the precharge control unit changes a length of the precharge process based on the engagement start time point detected by the engagement start detecting unit.

* * * * *